Dec. 27, 1955 A. J. SOLARI 2,728,591
ROTARY MECHANICAL SEAL
Filed Dec. 22, 1952 2 Sheets-Sheet 1
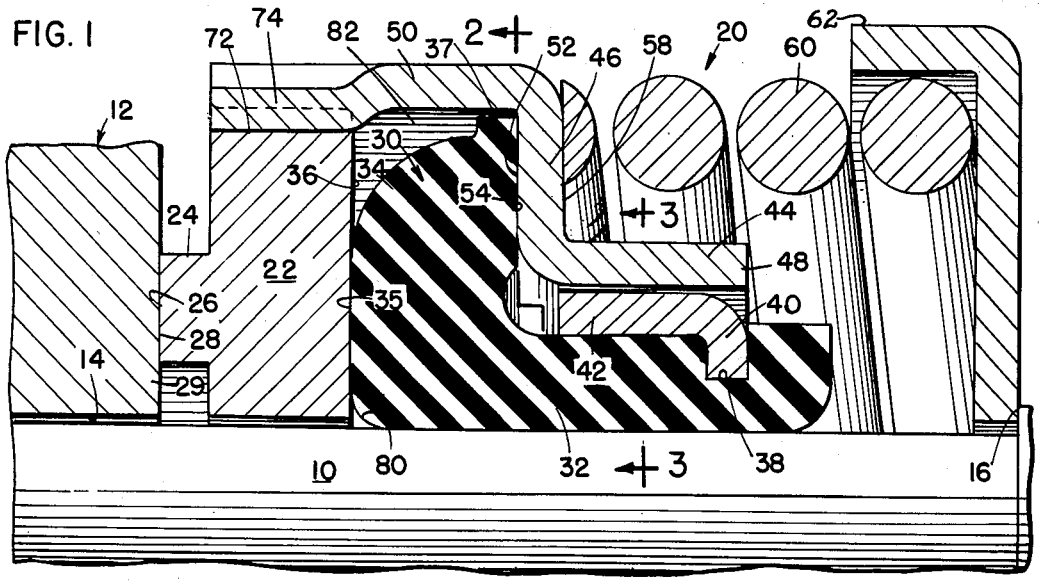
FIG. 1
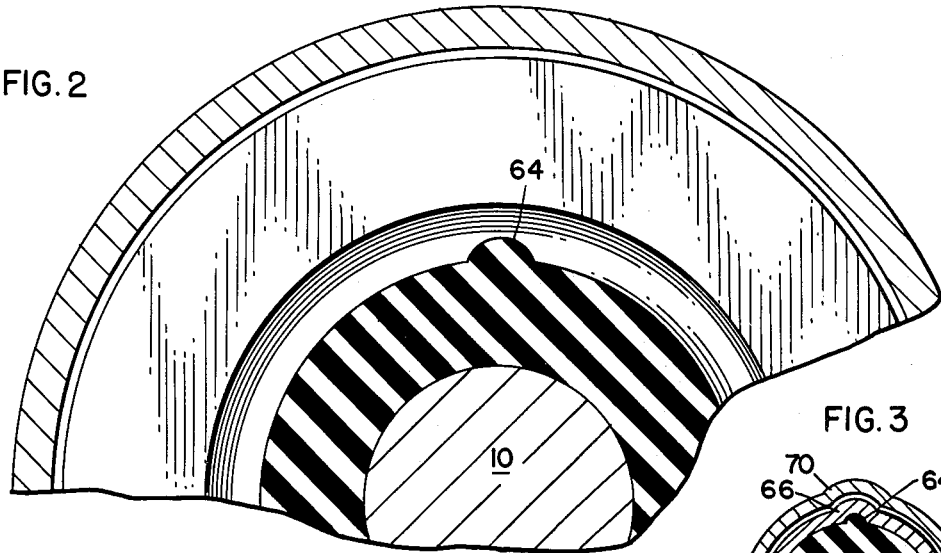
FIG. 2
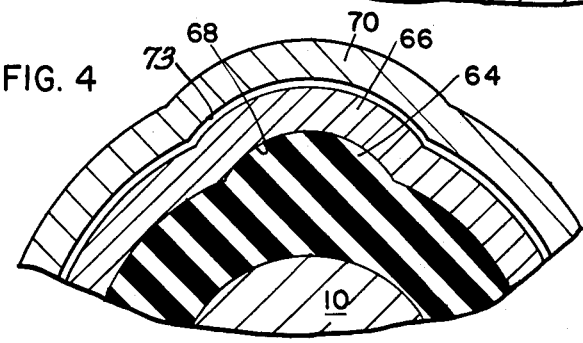
FIG. 3
FIG. 4
INVENTOR:
ARCHIE J. SOLARI
BY
Edward R. Lowndes Dec. 27, 1955  A. J. SOLARI  2,728,591
ROTARY MECHANICAL SEAL
Filed Dec. 22, 1952  2 Sheets-Sheet 2
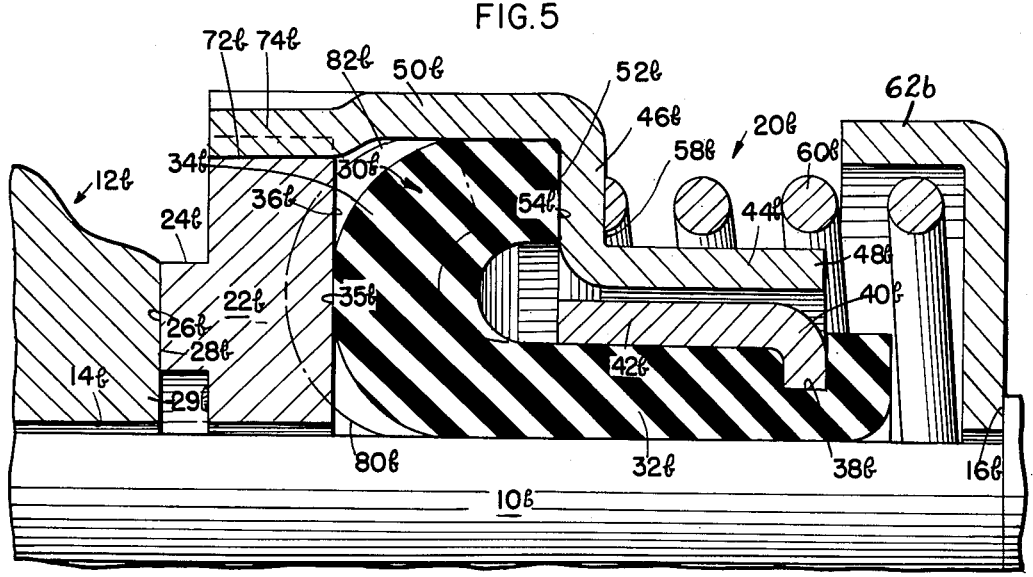
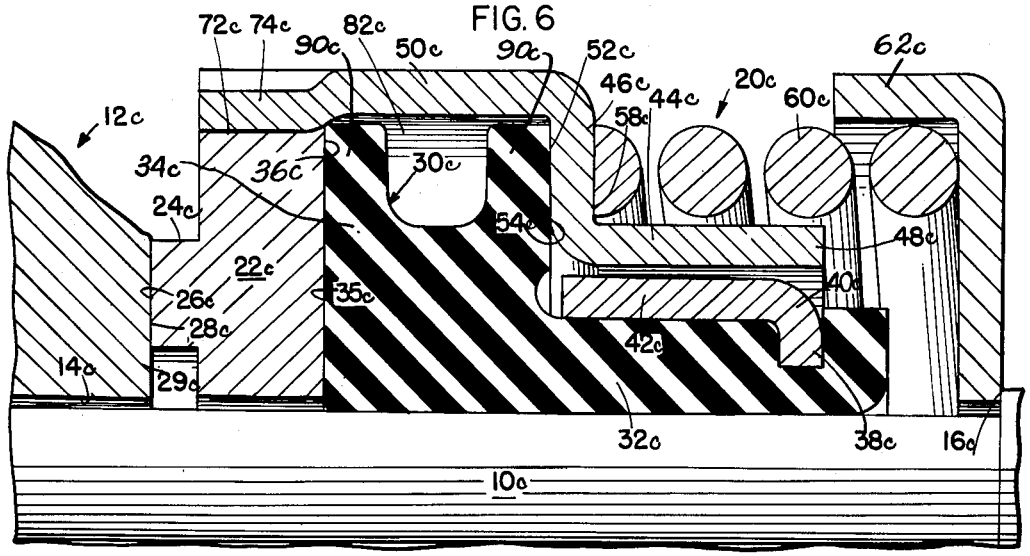
INVENTOR:
ARCHIE J. SOLARI
BY
Edward R. Lowndes _United States Patent Office_ 2,728,591
Patented Dec. 27, 1955

2,728,591

ROTARY MECHANICAL SEAL

Archie J. Solari, Chicago, Ill., assignor to Crane Packing Company, Chicago, Ill., a corporation of Illinois Application December 22, 1952, Serial No. 327,236

5 Claims. (Cl. 286—11.15)

The present invention relates to improvements in shaft seals and more particularly it relates to a mechanical rotary seal for effecting a seal against the passage of fluid between relatively movable machine parts, as for example between a shaft and a machine casing within which the shaft is rotatably mounted. Still more specifically the invention relates to a sealing device of this character in which the sealing effect between the relatively moving parts occurs at radially extending surfaces and wherein a so-called running seal is provided between the moving parts.

The present invention is designed as an improvement over mechanical seals of the type exemplified by the reissue patent to Snyder, No. 22,666 dated August 14, 1945. In a seal of this character a rigid sealing washer is normally urged against a stationary sealing seat and the washer in turn is seated against a resilient sealing member having a portion thereof preloaded upon the shaft so as to prevent fluid leakage along the surface of the shaft. Passage of fluid outwardly of the shaft is effectively blocked by the running seal at the washer and seat surfaces as well as by the pressure exerted between the washer and resilient sealing member. In order to maintain pressure at all times between the running faces of the seal, a compression spring is usually provided which bears at one end against a shoulder provided on the shaft and which bears at its other end against the resilient sealing member so as to force the latter into sealing engagement with the washer and in turn to force the washer against the seat.

The present invention is concerned specifically with improvements in the configuration of the resilient sealing member which engages both the shaft and the washer.

In seals of this general type a certain degree of flexibility of the resilient member is required in order to permit the rotary sealing washer to at all times maintain a sealing engagement with the stationary seat, regardless of variations in the contour of the members which may arise due to wear. Due to the confining nature of the space provided for the resilient sealing member within the seal casing, the usual tendency for the resilient member to expand slightly after considerable use causes the resilient member to exert undue pressure on the adjacent surfaces of the seal with which it is in contact, the attachment becoming more permanent the longer the seal remains in use. In extreme cases, the resilient member becomes firmly bonded to the shaft and to the portion of the seal casing with which it is in contact. Because of this attachment of the resilient member to the seal parts, the compression spring which tends to force the rotary sealing member against the stationary sealing member is unable to exert sufficient force to overcome the resistance to movement of the thus bonded sealing member, particularly after the running faces of the seal have become worn. In certain instances where a sufficiently strong spring is provided, the tendency is for the seal to become strained, cracked or torn, and no matter how small the damage may be to the resilient member, the seal will soon fail in operation.

Another limitation that is attendant upon seals of this general character having resilient tubular sealing elements resides in the fact that a relatively large mass of the rubber or other resilient material of which the member is formed, usually in the form of a flange, is provided at the end of the tubular member and adjacent the sealing washer, this enlargement affording increased sealing area at its region of contact with the washer and also affording a shoulder region against which the spring is adapted to bear for the purpose of urging the sealing member forwardly against the washer. Because of the fact that the rear region of the tubular sealing member is preloaded upon the shaft and is incapable of easy sliding movement along the shaft, a relatively heavy spring is required to displace the enlarged portion of the tubular member with sufficient force to maintain a tight running seal between the sealing washer and its seat. In other words the nature of the flexible member is such that it is not readily susceptible to longitudinal distortion unless acted upon by extremely heavy spring pressure.

The present invention is designed to overcome the above noted limitations that are attendant upon the use of prior seals of this type, and toward this end it contemplates the provision of a shaft seal assembly of the character briefly outlined above in which the resilient sealing element is so designed to afford adequate rubber distribution when the element expands, while at the same time alleviating binding of the element against any of the solid parts of the seal and thus preventing any undesired permanent union between the resilient seal member and the shaft or other seal parts.

The provision of a seal of this character which, as stated above, affords adequate room for expansion of the resilient sealing member being among the principal objects of the invention, another object is to provide such a seal wherein, when the seal is installed, the resilient member is distorted from its free condition and remains under tension in such a manner as to assist the spring in performing its normal function of urging the washer against its seat. By such an arrangement a seal assembly having a resilient sealing member which affords a large area of contact with the sealing washer is provided and may be employed with a spring of much smaller size than heretobefore.

A further object of the invention in a modified form thereof is to provide a seal of this type which not only affords adequate rubber distribution upon swelling of the sealing member but which also has associated therewith a resilient element which is so designed that pressures operating upon it will tend to expand the member in a longitudinal direction thereby assisting the action of the spring which normally urges the resilient member against the washer to in turn urge the washer against its seat.

The provision of a seal assembly which is extremely rugged and durable and which therefore is possessed of relatively long life; one which is comprised of a minimum number of relatively moving parts and which is therefore unlikely to get out of order; one in which the metallic parts thereof are comprised of light sheet metal stampings and which may therefore be manufactured at a relatively low cost; one which is effective not only against internal pressures but against external pressures and which may therefore be used in different types of installations; one which is effective over a wide range of temperatures and which therefore is versatile in its use; one which is easily assembled and installed in its position of use, and one which otherwise is well adapted to perform the services required of it are further desirable features that have been borne in mind in the production and development of the present invention.

Other objects and advantages of the invention, not at this time enumerated will become more readily apparent as the nature of the invention is better understood.

In the accompanying two sheets of drawings, forming a part of this specification, three embodiments of the invention have been shown for illustrative purposes. In these drawings:

Fig. 1 is a transverse sectional view taken substantially centrally and longitudinally through a shaft seal constructed in accordance with the principles of the present invention.

Fig. 2 is a sectional view taken substantially along the line 2—2 of Fig. 1.

Fig. 3 is a reduced sectional view taken substantially along the line 3—3 of Fig. 1.

Fig. 4 is an enlarged view of the upper portion of Fig. 3.

Fig. 5 is a sectional view similar to Fig. 1 showing a modified form of shaft seal, and Fig. 6 is a sectional view similar to Figs. 1 and 5 showing a still further modified form of shaft seal.

In all of the above described views similar characters of reference are employed to designate similar parts throughout.

While the shaft seal of the present invention is subject to numerous modifications in practice, depending upon the environment in which it is to be utilized, and also depending upon the engineering exigencies of a particular installation, it has been illustrated herein in three forms, each of which is particularly well adapted for use in a centrifugal fluid pump.

Referring now particularly to Figs. 1 to 4 inclusive wherein one form of the invention is disclosed, a sealing unit or assembly is shown as being applied to a shaft 10 having a surrounding casing 12 provided with an axial opening 14 through which the shaft extends and in which it is rotatably journaled. One end of the shaft is provided with a shoulder at 16, this end of the shaft serving to support thereon the pump impeller (not shown).

The seal assembly is designated in its entirety at 20 and involves in its general organization a sealing washer 22 which surrounds the shaft and which is provided with the usual forwardly extending nose piece 24 having a flat sealing surface 26 designed for running sealing engagement with a similarly flat sealing surface 28 provided on a radial wall 29 forming a part of the casing 12. The sealing washer 22 may be formed of any suitable material but it is preferably formed of an anti-friction material such as a synthetic thermosetting resin containing a powdered metal alloy of lead, antimony and tin, commonly known as Teepelite. The two sealing surfaces 26 and 28 are lapped flat so as to prevent egress or ingress of fluid in either direction across the running surfaces.

Positioned rearwardly of the washer 22 is a tubular flexible resilient sealing member 30 which is integrally fabricated in a single piece by a molding operation. The member 30 may be formed of rubber or it may be formed of any one of a number of suitable synthetic materials such as neoprene or the like which is impervious to oil, water, and the common commercial refrigerants but regardless of the specific materials of which the sealing member 30 is formed, the essential features of the invention are at all times preserved.

The member 30 is provided with a sleeve portion 32 which is preloaded upon and grips the shaft and which terminates at its forward end in a thickened generally radially extending flange portion 34, the forward face 35 of which is adapted to abut the rear face 36 of the sealing washer 22. The extreme peripheral region of the flange portion 34 is reduced to provide a peripheral lip 37 at the rear side of the flange. The rearward region of the sleeve portion 32 is provided with an annular groove 38 in which there is seated the inturned flanged end 40 of a tubular ferrule 42 which is telescopically received upon the sleeve portion 32. An outer tubular casing or retainer 44, which is of circular cross section throughout, encircles the washer 22, ferrule 42 and a major portion of the sealing member 30. The casing 44 is provided with a medial radial wall 46 which extends between a reduced cylindrical portion 48 and a large cylindrical portion 50 of the retainer. The wall 46 has a forwardly facing surface 52 which opposes the rearwardly facing surface 54 of the thickened radial portion 34 of the sealing member 30. The wall 46 also presents a rearwardly facing surface 58 against which there is adapted to bear the forward end of a compression spring 60, the rear end of the spring being nested within a cup-shaped spring-retainer 62 which surrounds the shaft 10 and which bears at its inner peripheral regions against the shoulder 16 provided on the shaft 10.

The washer 22 is adapted to be positively driven from the shaft 10 through the sealing member 30, ferrule 42 and retainer 44. Toward this end, as clearly shown in Figs. 3 and 4, the sleeve portion 32 of the member 30 is provided with a series of longitudinally extending ribs 64 which bridge the distance between the groove 38 and the radially extending flange portion 34 of the sealing member. While any desired number of such ribs 64 may be provided, four ribs are disclosed herein, these ribs being circumferentially spaced about the sleeve portion 32 ninety degrees apart. The ferrule 42 is provided with a series of outwardly extending ribs 66 providing internal longitudinally extending grooves 68 into which the ribs 64 extend so as to completely fill the void created by the grooves. The provision of the ribs 64 and grooves 68 serve to lock the ferrule to the sealing member and prevent relative rotation between these parts. It is to be noted from an inspection of Fig. 2 which represents in part an offset section on the line 2—2 of Fig. 1 that the ribs 64 extend all the way to the flange portion 34 of the sealing member. The cylindrical portion 48 of the retainer 44 is likewise provided with a series of external ribs 70 providing longitudinal extending internal grooves 72 which register with the ribs 66 on the ferrule 42 as shown in Fig. 4. The ribs 66 and 70 serve to prevent relative rotational movement between the retainer 44 and ferrule 42 while at the same time permitting relative axial movement between these parts for a purpose that will be made clear presently.

From the above description it will be seen that the sealing member 30, having a portion thereof preloaded upon the shaft, is itself driven from the shaft and its rotary motion is imparted to the ferrule 42 through the interlocking ribs 64 and 66. The ferrule, in turn, serves to drive the retainer 44 by means of the interlocking ribs 66 and 70 so that the three parts, namely the sealing member 30, ferrule 42 and retainer 44 rotate in unison and eliminate any peripheral drag on the flange portion 34 of the sealing member 30.

In order to establish a driving connection between the washer 22 and retainer 44, the washer is provided with a series of longitudinal extending peripheral grooves 72, of which there may be four in number, while the forward edge region of the outer cylindrical portion 50 of the retainer 44 is provided with a series of indentations 74 which project into the grooves 72, thus completing the drive from the shaft 10 through the ferrule and retainer to the washer 22.

Referring now to Fig. 1, it will be seen that a slight clearance is provided as at 80 between the material of the sealing member 30, the rear face 36 of the washer and the surface of the shaft 10. A similar but larger annular clearance 82 is provided between the surface of the sealing member 30, the rear surface 36 of the washer 22 and the inner cylindrical surface of the outer portion 50 of the retainer 44. This latter clearance or void, together with the specific shape of the flange portion 34 of the sealing member 30, permits an advantageous distribution of the rubber or other material of which the sealing member is formed after the seal has been put to use in an actual installation. After the nose portion 24 of the washer 22 wears under constant use of the seal, the slack that ordinarily would be created is taken up by the action of the spring 60 which forces the retainer 44 and consequently the radial wall 46 forwardly so as to deform the sealing member 30 by flexing the radial flange 34 thereof. A slight clearance is provided between the inner circumference of the cylindrical portion 50 and the lip 37 of the flange 34 so that this latter flange may tend to straighten out, so to speak, and in so doing tend to decrease the extent of the void 82 as the rubber or other material is forced into this space. Any swelling of the resilient material will not create undue pressure on the washer 22 since the space 82 is available to assimilate expansion of the sealing member 30. It is to be noted that the opposed faces 35 and 36 on the sealing member 30 and washer 22 respectively and the opposed surfaces 52 and 54 on the retainer 44 and sealing member 30 respectively are comparatively wide and thus a very effective seal against the ingress or egress of fluid past these opposed faces is provided.

In Fig. 5 a somewhat modified form of the invention has been shown. In this view the various elements which cooperate to make up the seal assembly remain substantially the same as in the form of the invention shown in Figs. 1 to 4 inclusive with the exception of a modification in the design of the sealing member. Thus in order to avoid needless repetition of description similar characters of reference have been employed in Fig. 5 to designate the parts which correspond to those of Fig. 1. In the form of the invention shown in Fig. 5 the sealing member 30b is provided with a reverse bend 34b in the forward region thereof which is more or less uniform in its configuration and which provides a forward sealing surface 35b designed for sealing contact with the surface 36b of the washer 22b. The rear face 54b of the reverse bend is designed for sealing engagement with the surface 52b provided on the radial flange 46b of the retainer 44b. The sealing member 30b, in effect, remains essentially the equivalent of the sealing member 30 shown in Fig. 1. The relief area 82b within the retainer has not been dispensed with and this void exists in the structure to accommodate distortion or expansion of the flange portion of the sealing member. The flange portions 34 and 34b of the two structures respectively are quite similar from cross sectional considerations, the main point of difference being the effect that the radial lip 37 is absent in the structure of Fig. 5.

The seal of Fig. 5 is shown in an actual installation wherein the surface 26b of the nose piece 24b bears against a radial sealing surface 28b provided on the casing 12b. The sealing member 30b is thus deformed and under tension within the seal assembly so that a portion thereof is compressed between the radial wall 46b of the retainer 44b and the rear face 36b of the washer 22b. The normal contour of the sealing member 30b is represented by the dotted lines in Fig. 5 and the contour thereof, as it exists in an actual installation is shown in full lines.

In actual installation of the seal the sealing member 30b assumes a longitudinal position on the shaft 10b which is such that when the washer is brought into position against the wall 29b, the reversed bend 34b is displaced rearwardly of the seal by a curling action so that a forward thrust on the washer 22b will exist independently of the action of the spring 60b. By such an arrangement an extremely light spring 60b may be employed with substantially the same effect as the heavier spring 60 employed in connection with the seal of Fig. 1. The spring 60b, despite its light character, will be sufficient to maintain adequate sealing engagement between sealing surfaces 26b and 28b, since the action of the spring is augmented by the tension of the reverse bend 34b provided in the sealing member 30b.

The modified form of the invention shown in Fig. 6 is similar to the forms of the invention shown in Figs. 1 and 5 respectively. As in Fig. 5, similar characters of reference have been applied to the various parts of Fig. 6 which correspond to similar parts in the other views. The seal assembly 20c of Fig. 6 deviates from the seal assembly of Fig. 5 only in the configuration of the resilient sealing member 30c. In this latter form of the invention the forward end of the sleeve portion 32c of the sealing member is provided with a relatively thick radially extending flange portion 34c and this flange portion is provided with an annular peripheral groove or clearance space 82c which provides on either side thereof a pair of flexible lips 90c. By such an arrangement when pressure is developed within the space 82c, the pliant lips 90c are pressed against the surfaces 36c and 52c so that an effective seal between these two surfaces and the material of the sealing member 30c is afforded. Furthermore, the void 82c affords room for an equitable distribution of the rubber or other material of the sealing member in the event that expansion of the material of the sealing member takes place after long and continued use.

In compliance with section 4888 of the revised statutes, a preferred form of the invention has been shown in the drawings and has been described herein, but it should be understood that the invention is not limited to the specific disclosure made, and that the appended claims should be construed as broadly as the prior art will permit.

What is claimed is:

1. In an end thrust seal assembly for relatively rotatable elements including a casing and a shaft extending into the casing, an anti-friction sealing washer adapted to surround the shaft and having a forward end surface designed for running engagement with a radial surface on the casing, a tubular sealing member formed of resilient deformable material, said member having an internal diameter enabling the same to be preloaded upon the shaft, said member including a rearwardly disposed sleeve portion and a forwardly disposed radially extending flange portion providing a forward face in sealing engagement with the rear face of the sealing washer, a retainer encompassing at least a portion of said washer and at least a portion of the resilient sealing member and provided with a radial wall in sealing engagement with a rear surface of said flange portion and a reduced rearwardly extending sleeve portion encompassing the sleeve portion of the resilient sealing member, the radial extent of said flange portion being substantially equal to the radial extent of the radial wall of the retainer, a portion of the outer peripheral edge of said flange portion being relieved to provide an annular clearance space within the retainer to allow for expansion or distortion of the flange portion, a sleeve-like ferrule surrounding the sleeve portion of the resilient sealing member, there being a series of inter-fitting ribs on the sleeve portion of the resilient sealing member, the ferrule and the sleeve portion of the retainer establishing a driving connection between these parts, means establishing a driving connection between said retainer and washer, and means normally urging the retainer forwardly along said shaft.

2. In an end thrust seal assembly for relatively rotatable elements including a casing and a shaft extending into the casing, an anti-friction sealing washer adapted to surround the shaft and having a forward end surface designed for running engagement with a radial surface on the casing, a tubular sealing member formed of resilient deformable material, said member having an internal diameter enabling the same to be preloaded upon the shaft, said member including a rearwardly disposed sleeve portion and a forwardly disposed radially extending flange portion providing a forward face in sealing engagement with the rear face of the sealing washer, a retainer having an outer cylindrical portion surrounding said washer and flange portion of said sealing member, a cylindrical sleeve portion of reduced diameter surrounding the sleeve portion of the sealing member, and an interconnecting radial wall, said radial wall bearing against a rear face of the flange portion of said sealing member in sealing relationship, a plurality of longitudinally extending ribs formed exteriorly on said sleeve portion of the sealing member, a ferrule surrounding the sleeve portion of the sealing member and formed with a series of ribs fixedly interlocking with said first mentioned ribs, a series of longitudinally extending ribs formed on the sleeve portion of the retainer and slidingly interlocking with the ribs provided on the ferrule, and a coil spring normally urging said retainer forwardly on the shaft.

3. An end thrust seal as claimed in claim 2 in which the periphery of the flange portion of the resilient sealing member is provided with a relatively wide medially disposed circumferential groove providing an annular clearance space within said retainer to allow for expansion or distortion of said flange portion, said groove providing a pair of spaced sealing lips on opposite sides thereof designed for sealing engagement with the rear face of the washer and with the radial wall of the retainer.

4. In an end thrust seal assembly for relatively rotatable elements including a casing and a shaft extending into the casing, an anti-friction sealing washer adapted to surround the shaft and having a forward end surface designed for running engagement with a radial surface on the casing, a tubular sealing member formed of resilient deformable material, said member having an internal diameter enabling the same to be preloaded upon the shaft, said member including a rearwardly disposed sleeve portion and a forwardly disposed radially extending flange portion providing a forward face in sealing engagement with the rear face of the sealing washer, an open ended tubular retainer having a forward enlarged cylindrical portion encompassing at least a portion of the washer and also encompassing the flange portion of the sealing member, said retainer having a rearwardly disposed cylindrical portion of reduced diameter encompassing at least a portion of the sleeve portion of said sealing member, said retainer also having a radial wall interconnecting said cylindrical portions, the forward face of said radial wall within the retainer bearing against a rear face of the flange portion of said sealing member in sealing relationship with respect thereto, a ferrule surrounding the sleeve portion of the sealing member and interposed between the latter and the reduced cylindrical portion of the retainer, a plurality of outwardly struck ribs formed on the ferrule and into which the material of the sleeve portion of the sealing member extends, means providing a series of recesses in the reduced cylindrical portion of the retainer, said recesses slidingly interlocking with the ribs on the ferrule, interengaging means on the washer and enlarged cylindrical portion of the retainer establishing a driving connection therebetween, and a coil spring having one end engaging the radial wall of the retainer and having its other end adapted to bear against a radial surface normal to and turning with the shaft.

5. In an end thrust seal assembly, the combination set forth in claim 1 wherein said flange portion is formed with a peripheral lip, the external diameter of which is substantially equal to the radial extent of the radial wall of the retainer.

References Cited in the file of this patent

UNITED STATES PATENTS

| Re. 22,666 | Snyder | Aug. 14, 1945 |
| 2,208,620 | Baisch | July 23, 1940 |
| 2,375,985 | Freeman | May 15, 1945 |
| 2,378,095 | Payne | June 12, 1945 |
| 2,425,209 | Snyder | Aug. 5, 1947 |
| 2,463,695 | Jensen | Mar. 8, 1949 |
| 2,525,366 | Meyer | Oct. 10, 1950 |

FOREIGN PATENTS

| 505,087 | Germany | Aug. 13, 1930 |